United States Patent [19]

Rouverol

[11] Patent Number: 5,341,699
[45] Date of Patent: Aug. 30, 1994

[54] ZERO DYNAMIC INCREMENT GEARING
[75] Inventor: William S. Rouverol, Berkeley, Calif.
[73] Assignee: Axicon Gear Company, Berkeley, Calif.
[21] Appl. No.: 43,375
[22] Filed: Apr. 6, 1993
[51] Int. Cl.$^5$ ............................................. F16H 55/08
[52] U.S. Cl. ........................................................ 74/462
[58] Field of Search .......................... 74/462, DIG. 12
[56] References Cited

U.S. PATENT DOCUMENTS

| | | | |
|---|---|---|---|
| 3,982,444 | 9/1976 | Rouverol | 74/462 |
| 5,022,280 | 6/1991 | Boiko et al. | 74/462 |
| 5,083,474 | 1/1992 | Rouverol | 74/462 X |

FOREIGN PATENT DOCUMENTS

| | | | |
|---|---|---|---|
| WO88/03623 | 5/1988 | PCT Int'l Appl. | 74/462 |
| 929915 | 5/1977 | U.S.S.R. | 74/462 |

Primary Examiner—Allan D. Herrmann

[57] ABSTRACT

Spectrum analyses of gear noise show that the predominant frequencies are the tooth contact frequency (1×TCF) and twice the tooth contact frequency (2×TCF). The reason for this is that at two positions in the tooth engagement cycle, the effective mesh stiffness of conventional gearing differs substantially from the ideal mesh stiffness that eliminates the dynamic increment of load. One of these two positions occurs once per tooth engagement cycle and the other one twice, giving rise to the 1×TCF and 2×TCF excitations respectively. These periodic fluctuations in the effective mesh stiffness, which are in proportion to what is called "static transmission error," produce inertia forces between engaged teeth that increase with both speed and proximity to the critical (resonance) speed of the gear pair. In conventional gearing the dynamic increment of load generated by these inertia forces can be as large as or even larger than the useful transmitted load. Not only is this dynamic increment non-useful, it is actually detrimental, since it increases operating noise and diminishes the torque capacity available for useful power transmission. Accordingly, the optimization of any gear pair requires that the dynamic increment be eliminated. This is done by introducing a special pattern of topological modifications to the tooth working surfaces. There is also an optimum form of these modifications which maximizes the torque capacity of the gear pair without sacrificing any of the quietness attainable through minimization of the transmission error.

52 Claims, 4 Drawing Sheets

ZERO DYNAMIC INCREMENT GEARING

BACKGROUND OF THE INVENTION

FIELD OF THE INVENTION

This invention relates to the shape of gear teeth. Specifically it relates to the utilization of particular gear tooth characteristics that greatly smooth gear meshing action so that the critical speeds of gear pairs with respect to noise and dynamic load are substantially eliminated while the torque capacity is substantially increased. The invention compromises additions to and improvements on the concepts disclosed in U.S. Pat. No. 5,083,474 (hereinafter Reference 1).

SUMMARY OF THE INVENTION

Spectrum analyses of gear noise show that the predominant frequencies are the tooth contact frequency (1×TCF) and twice the tooth contact frequency (2×TCF). The reason for this is that at two positions in the tooth engagement cycle (i.e. at two positions along each base pitch length of the path of contact), the effective mesh stiffness of conventional gearing differs substantially from the average mesh stiffness. One of these two positions occurs once per tooth engagement cycle and the other one twice, giving rise to the 1×TCF and 2×TCF excitations respectively. These periodic fluctuations in the effective mesh stiffness, which are in proportion to what is called "static transmission error," produce inertia forces between engaged teeth that increase with both speed and proximity to the critical (resonance) speed of the gear pair. In conventional gearing the dynamic increment of load generated by these inertia forces can be as large or even larger than the useful transmitted load. Not only is this dynamic increment non-useful, it is actually very detrimental, since it increases operating noise and diminishes the torque capacity available for useful power transmission.

Accordingly, two major objects of the invention are to optimize gear performance with respect to both quietness of operation and maximization of power density (allowable torque per unit of weight). Both of these objectives are attained by reducing the static transmission error to such a degree and in such a manner that the gearing is substantially free of dynamic increment at all loads and all speeds, and to carry out this minimization of transmission error by means of a particular set of topological modifications that not only maximizes the torque capacity of the gear pair, but also maintains quietness at part load, as well as full load, allows for a minimum amount of material to be removed by the finishing operation (grinding or shaving), and lends itself to embodiments that have complete interchangeability. These and other objects and advantages of the invention will be evident from the drawings as explained in the specification that follows:

DESCRIPTION OF THE PREFERRED EMBODIMENTS

Figure 1:
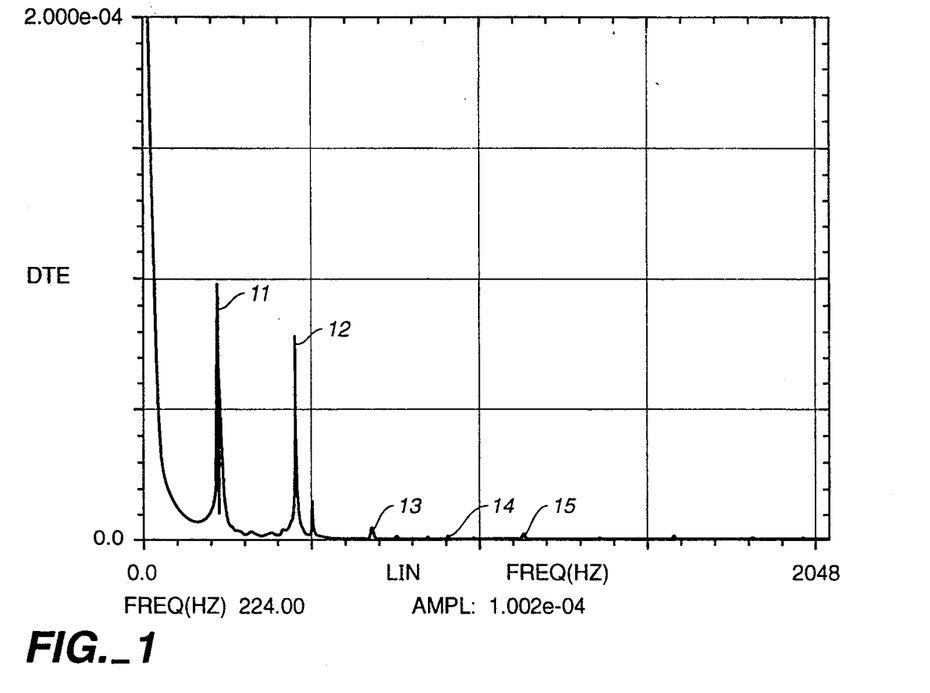
FIG. 1 is a typical graph of dynamic transmission error (DTE) for a conventional gear pair, showing how DTE varies with frequency.
Figure 2:
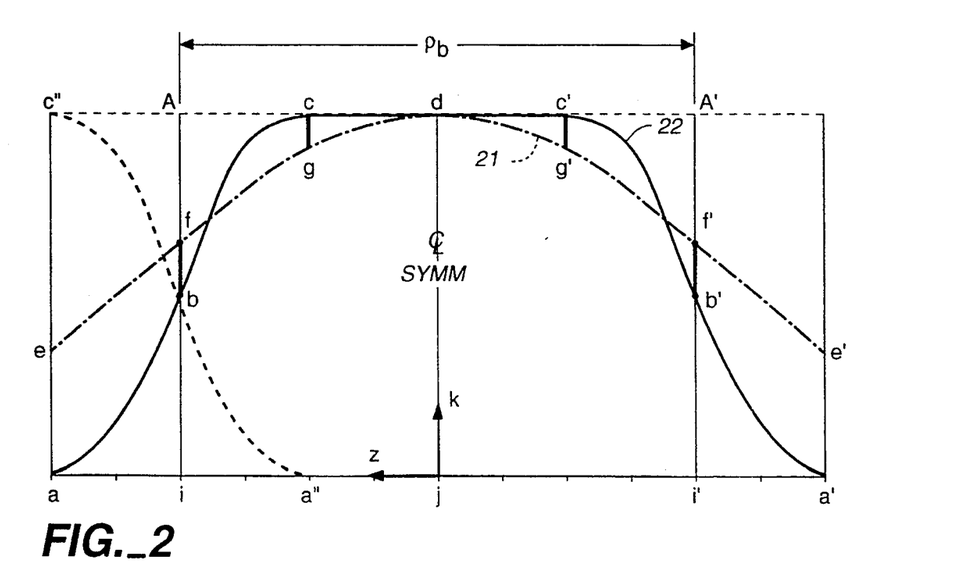
FIG. 2 is a graph of tooth pair stiffness as a function of engagement path position (or roll angle), showing how a conventional stiffness curve deviates from an ideal stiffness curve with a synchronization ratio of one.
Figure 3:
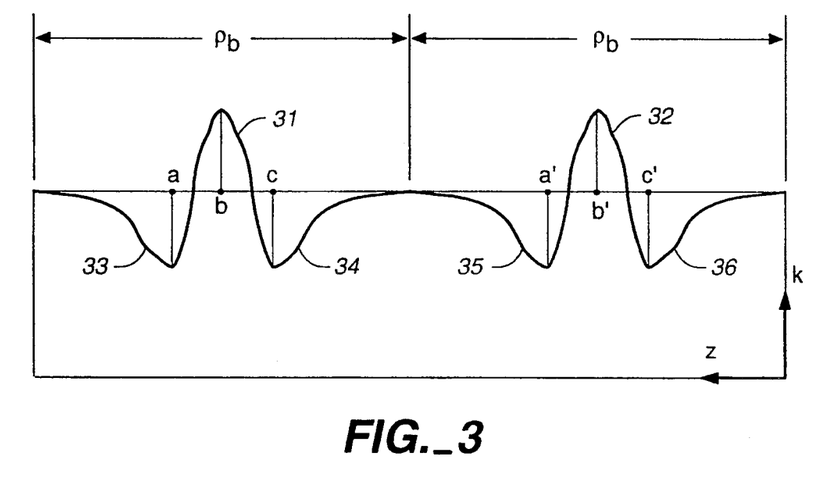
FIG. 3 is a graph similar to that of FIG. 2 but to a smaller scale, for the full mesh instead of a single tooth pair, and for two complete tooth engagement cycles instead of one.

In detail and referring to the drawings, FIGS. 1, 2 and 3 are introduced in order to explain the nature and origin of gear dynamic increment and noise. The explanation presented with the aid of these three figures appears to account fully for the main characteristics of gear excitation and to provide a rational basis for the method disclosed below for eliminating from any gear pair the dynamic increment of load and the noise that it generates.

FIG. 1 shows a typical spectrum of the dynamic transmission error for a conventional prior art spur gear pair. The predominant frequencies are the tooth contact frequency (1×TCF), appearing as spike 11 at 224 Hertz, and twice the tooth contact frequency (2×TCF), appearing as spike 12 at 448 Hertz. DTE at higher frequencies, at 3,4,5, etc. times TCF (spikes 13,14,15 etc.), is too small to have a significant effect on gear set performance.

Gear engineers have long appreciated that the 1×TCF is associated with tooth loading and unloading, but the 2×TCF excitation has long been a mystery. Of these two main excitation frequencies, the 2×TCF is nearly always as prominent as the 1×TCF and often more so, because it reaches the resonance (critical) speed at half at high a driving speed as the 1×TCF excitation and is therefore much more often within the operating speed range of the gear set.

FIGS. 2 and 3 show where this 2×TCF excitation comes from. FIG. 2 shows two tooth pair stiffness curves. The first is an approximately parabolic curve 21 (e,f,g,d,g',f',e') that plots what in this specification will be called a "conventional tooth pair stiffness curve." It has lead crowning, which most power train gearing has, but the usual tip relief, which would typically be straight lines connecting points f and a, and f' and a', respectively, has been omitted in the interest of simplicity. The parabola-like shape of curve 21 is the result of the increased compliance of the teeth at the outer portions of the path of contact, as a result of tip loading of the teeth of one of the mating pair. (See also FIGS. 5 and 6, and text relating thereto, in Reference 1.)

The second tooth pair stiffness curve 22 in FIG. 2 is what was called in Reference 1 a "zero transmission error" tooth pair stiffness curve. The term "zero transmission error" (ZTE) means that when the ordinates of the curve are added to the ordinates of all possible overlapping identical ZTE curves offset by one pitch angle, the ordinate sum is constant for all roll angles. A ZTE curve is therefore a useful tooth pair stiffness curve for all forms of toothed gearing, since it generates no variations in mesh stiffness and no static transmission error, and therefore no noise or dynamic increment of load.

Comparison of the curves 21 and 22 in FIG. 2 shows that the conventional tooth pair stiffness curve 21 is too stiff at the roll angles of points f and f', by the stiffness increments f-b and f'-b' respectively, and too compliant at the roll angles of and adjacent to points c and c', by stiffness increments g-c and g'-c' respectively. These deviations from the ZTE stiffness curve 22 produce a periodic fluctuation in the mesh stiffness that is diagrammed in FIG. 3. This figure, which is to a smaller scale than FIG. 2 and covers two pitch angles of rotation instead of one, shows the explanation to the origin of the $2 \times TCF$ excitation frequency: Each pitch angle of rotation (i.e., each full meshing cycle) includes one excessive stiffness peak (31 or 32), but two excessive compliance valleys (33,34 or 35,36). This indicates that it is the insufficient tooth pair stiffness at the inner ends of the loading ramps, that is to say, at the roll angles in the vicinity of points c and c', that produces the $2 \times TCF$ excitation indicated as spike 12 in FIG. 1.

The amplitude of spikes 11 and 12 in FIG. 1 will be seen to be fairly small, of the order of one ten thousandth of an inch (0.025 mm). However the frequency of the excitation is quite low, relative to the frequencies at which most gears exhibit serious problems of noise and high dynamic increment. The frequency of 24 Hz. corresponds to a 22 tooth pinion turning at about 10 revolutions per second or 600 rpm. In many gear applications this is at the lower end of the operating speed range and would represent a domain where the "magnification factor" is very small and is increasing only very little faster than linearly with speed. When the resonance or "critical" speed is approached, on the other hand, the magnification factor increases rapidly, and the DTE amplitudes may be several times those shown in FIG. 1. At low loads these large DTE amplitudes can cause tooth separation, which generates a serious noise problem called "gear rattle," and at high loads the dynamic increment is of such a magnitude that it can diminish the useful torque capacity of the gear set by 20 to 50%, or in some cases even more.

Reference 1 disclosed methods of eliminating this kind of excitation by using "differential crowning" to transform curves such as 61 in FIG. 13 of the reference into "zero transmission error" curves such as 131. The present invention elaborates and extends the disclosures of Reference 1 by disclosing how the methods proposed in that patent can be improved on so as to increase the torque capacity by 30 to 50%, and also to maintain the freedom from significant transmission error at all loads from zero to maximum allowable load, and to achieve these advantages with embodiments that minimize finishing costs and also have full interchangeability.

In the present specification the term "differential crowning" means local changes in the amount or shape of the total lengthwise crowning that increase or decrease the tooth stiffness at particular roll angles. "Net" crowning is the sum of the "lead" (or "basic") crowning, which is the same at all roll angles, and the "supplementary crowning," which is different at different roll angles. For this specification, crowning thus has two components, one of which is constant and one variable. If the net crowning at a particular roll angle is greater than the lead crowning, the difference is called "positive supplementary crowning." If the net crowning is smaller than the lead crowning, the difference is called "negative supplementary crowning."

At any given pinion roll angle the "composite net crowning" is the sum of the net crowning for the pinion at that roll angle and the net crowning for the gear at the corresponding gear roll angle. Composite net crowning can thus have as many as four components, since it can include lead crowning for both members and possibly also supplementary crowning for both members. The term "initial separation" (I.S.) refers to the distance between mating points-on the gear and pinion teeth when the working surfaces are in contact at the high point but are not loaded (i.e., zero applied torque). I.S. will include the effects of as many of the four crowning components as are present in the design, plus any other effects that are present and increase or decrease the distance between the mating points, such as misalignment, composite lead error, tip relief, root relief, or manufacturing errors.

In the foregoing descriptions and those below it will be noted that the term "roll angle" and "transverse displacement" (z) are used more or less interchangeably. This is because these two paramaters are linearly related, since the distance of a point on the transverse profile from the point of tangency of the pressure line with the base circle is equal to the roll angle times the base radius. As is well known, the base radius is one of the two design paramaters for involute gearing that does not vary with operating center distance (the other being the base helix or spiral angle). Accordingly, any diagram that shows tooth pair stiffness as a function of transverse displacement z along the path of contact will have exactly the same shape if plotted as a function of pinion or gear roll angle. Only the abscissa scale and units will differ, by the factor of the pinion or gear base radius, as the case may be.

The kind of tooth pair stiffness curve that was called a "zero transmission error curve" in Reference 1 has in the present specification been renamed as a "self-complementary" tooth pair stiffness curve to distinguish it from its earlier form, the difference being that the "self-complementary" curve is an optimum zero transmission error (ZTE) curve. That is to say, the new curve still has a zero transmission error characteristic, but is the particular ZTE curve that affords the maximum torque capacity, allows for the least expensive finishing, and lends itself to embodiments that have complete interchangeability.

The reasons for making this distinction lie primarily in the potentially detrimental effects of crowning on torque capacity. A limited amount of crowning has been found to be advantageous in power train gearing because it reduces the load applied to the tooth ends as a result of lead error and misalignment. But when this crowning is increased beyond the minimum amount needed to control tooth end loading, torque capacity is substantially diminished. For example, if the crowning is say doubled, this will increase the specific load (load per linear inch or millimeter of tooth length) by 30 to 35%. This increases tooth stresses by a comparable amount and therefore reduces torque capacity by about 25%. When this loss of torque capacity is taken into consideration, it becomes immediately apparent why it is essential to minimize the magnitude of the maximum corrections that must be made when the conventional tooth pair stiffness curve is transformed into an optimum zero transmission error curve, if that curve is to be what is called in this specification a "self-complementary" tooth pair stiffness curve. Ideally, these maximum corrections should not exceed twenty percent, and preferably not more than ten percent, of the ordinates of the conventional tooth pair stiffness curve.

Examination of FIG. 10 in Reference 1 shows that when the crowning is doubled (curve 104 as compared to curve 101 in that figure), the mesh deflection for a given torque load increases by about 15%. This percentage increase varies inversely with the magnitude of the initial crowning but tends to be fairly independent of load. To put this 15% increase into perspective, the required correction in the case of the diagram of FIG. 2 is increment f-b, which is about 25% of ordinate f-i. The analogous correction required in the case of the diagram of FIG. 9 of Reference 1 is increment i-b, which is about 30% of ordinate i-r. Corrections of this magnitude require major increases in the net crowning at b and b', to the degree that a critical Hertz stress may be produced at that roll angle, reducing the torque capacity in a manner that is totally unnecessary. The present invention discloses an improved method of correcting the deviations of the self-complementary curve from the conventional tooth pair stiffness curve at b and c (and of course b' and c'). This improved method is explained with the aid of FIG. 4.

Figure 4:
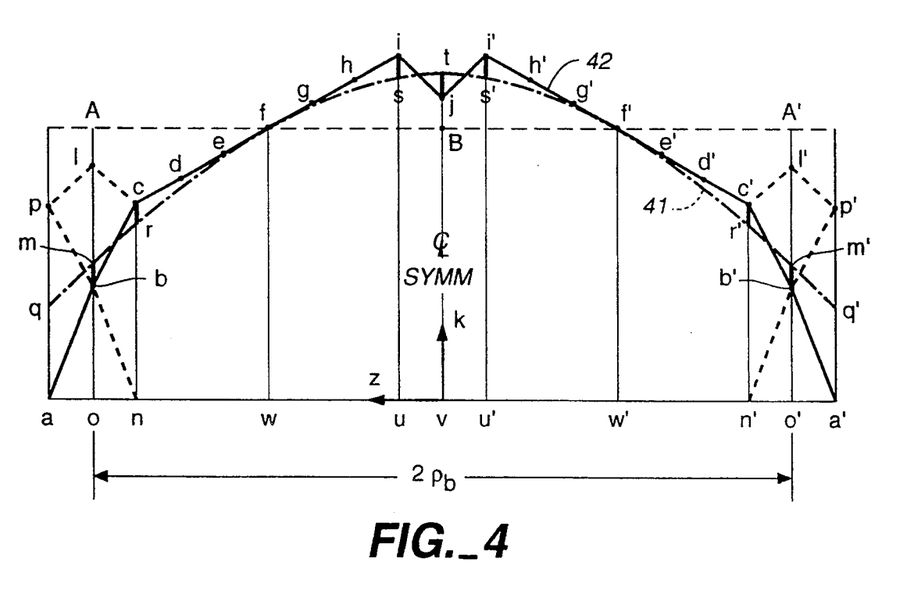
FIG. 4 is a graph similar to that of FIG. 2 but for a gear pair that has a synchronization ratio of two instead of one.

The improved self-complementary curve 42 shown in FIG. 4 will be seen to have a synchronization ratio of two. (The synchronization ratio is defined in this specification as the synchronization length in accordance with Reference 1 (distance b—b') divided by the base pitch. In all cases the synchronization ratio is an exact integer.) Because the synchronization ratio is greater than unity, it allows the corrections to be spread over at least one additional tooth pair, so that each correction may be smaller. In effect, it is a way to take maximum advantage of the fact that when the synchronization ratio is two, there is always one more tooth pair in contact than when the ratio is one. If that extra tooth pair is given the same type of differential crowning as the outer teeth (at b,b',c and c'), the extra tooth pair no longer tends to mitigate the corrections made at the ends of the ramps, but instead augments them, or if desired can even supplant them.

For example, if the net crowning at b and b' is increased in order to reduce the stiffness of ordinates m and m' to that at b and b', respectively, the reduced stiffness transfers a substantial amount of load to the tooth pair at t, which is already substantially stiffer than the teeth at b and b' and therefore carrying much more load. This shift of load to the tooth pair at the center of the path means that the corrections at b and b' will be that much less effective, so even more crowning must be employed to obtain the needed reduction in mesh stiffness. Unless the face is extremely wide, the crowning at b and b' can approach a gable shape, such as curve 103 or 105 in FIG. 10 of Reference 1, and this produces extremely high stresses at the peak of the crown when the transmitted torque is large. This serious stress concentration can be entirely avoided if the crowning at t is increased by a sufficient amount. The stiffness ordinate v-t will then be reduced to that represented by ordinate v-j, and the required reduction in mesh stiffness achieved without excessive crowning at b, b'.

This increased crowning at the roll angle of point t will of course concentrate more of the transmitted load at the center of the tooth, as compared the ends. This would be undesirable in most cases, particularly since the pitting hazard is at its worst near the pitch point. In this case, however, the increase in crowning at this roll angle reduces the tooth pair stiffness which in turn shifts load back to points b and b'. The net effect on Hertz and bending stresses will be favorable, because the reduction in the maximum amount of correction needed (increments m-b,t-j, and m'-b') will be greatly reduced, and this allows the basic or lead crowning for the set to be significantly reduced.

It will be noted that the self-complementary curve 42 in FIG. 4 shows additional deviations from the conventional tooth pair stiffness curve 41 at points s and s'. These points, which are one pitch angle inside the roll angles at c' and c, respectively, have been given increased stiffness, by the ordinate increments s-i and s'-i', by reducing the crowning at their roll angles. (There is, however, a limitation on the crowning at c and c' that is different from the limitation at b and b'. Instead of a problem of high local load, the problem is one of the undesirability, for reasons of fabrication cost, of using negative supplementary crowning that has an absolute value greater than the lead crowning. This would result in a net crowning that was negative, that is to say concave, and this would result in a need to grind or shave off a considerable amount of material over the entire remainder of the tooth working surface. So, while negative crowning is physically possible if the mating surface has lead crowning of greater absolute value, the deterrent is an economic one.)

The use of zero net crowning at c or c' or both, on the other hand, can be highly desirable, because it gives the maximum stiffness at such points for a given amount of lead crowning. Since it is an increase in mesh stiffness at c and c' that is needed to eliminate the 2×TCF excitation (see FIG. 3), zero net crowning at c or c' is obviously a desirable feature. But again there are limitations. Perfect symmetry of the conventional tooth pair stiffness curve is not often realized, so it becomes necessary to use different corrections on the pinion and gear in order to impart the perfect symmetry that the self-complementary curve must have. This of course rules out zero net crowning at all of points c, c', i, and i'. At best one or two of these points can have it. In addition, the composite total crowning at c and c' can rarely be smaller than the net lead crowning, which is usually half of the composite lead crowning, because differential crowning near the start of active profile is limited by the need to maintain profile convexity at roll angles smaller than four or five degrees. Zero net crowning is possible, on the other hand, at points i and i' for both the pinion and the gear. However this would leave these roll angles with zero composite crowning, eliminating the main safeguard against excessive tooth end loads that result from misalignment and lead error. Accordingly, it is recommended that if zero net crowning is used at either i or i' on either member, the crowning of the other member at the mating roll angle should be the full lead crowning. That is to say, there should be zero supplementary crowning for that member at that roll angle. The minimum composite crowning at i or i' would thus be half the composite lead crowning, which is the same minimum crowning recommended for points c and c'.

These considerations lead to a valuable prescription for optimizing the shape of the self-complementary curve. If we refer to the roll angles at c, c' i, and i' as the "stiffening-needed" roll angles, and note that one of them in all probability has a greater deviation between its ordinates on curves 41 and 42 than the others, that roll angle should on one or both members be given composite supplementary crowning within plus or minus twenty percent, and preferably within plus or minus ten percent, of half the composite lead crowning. If the composite lead crowning is evenly divided between the pinion and the gear, this would give the effect of a net crowning on one member reasonably close to zero and insure that at this critical roll angle the self-complementary curve will have the optimum ordinate. The other three stiffening-needed roll angles, because they will probably require smaller corrections, will all have either equal or smaller magnitudes of composite negative supplementary crowning.

Two critical geometric properties of curve 42 in FIG. 4 should be noted. The first is that when a pair of identical self-complementary curves are displaced laterally by two base pitch lengths, the right hand ramp c'-b'-a' will occupy the dotted line position at left shown as p-b-n. Adding the overlapped ordinates of the triangle a-b-n to those of curve 42 exactly doubles the combined stiffness to the dotted line p-l-c, since the ordinate o-b is exactly equal to ordinate b-l. This produces what is herein called the "overlapped self-complementary curve," l-c-i-j-i'-c'-l. The critical characteristic of this curve is that it insures that the ramps are shaped and proportioned so the rates of mesh loading and unloading are (a) identical in absolute value and (b) synchronized, so that the process of tooth entry into and exit from the field of contact produces no significant transmission errors. Accentuation of the word "mesh" in this statement is intended to draw attention to the fact that when the corrections are spread to an additional tooth pair at the center of the stiffness curve, increases or decreases in the stiffness of that tooth pair affect the rate of loading or unloading of the mesh at least as much as stiffness changes at the ramp roll angles.

The second critical geometric property of curve 42 is the special kind of symmetry that is common to all ZTE curves including self-complementary curves. This is called in this specification "inverse offset symmetry," and means that for every point on the overlapped ZTE or self-complementary curve there is a point that is (a) a mirror image about the horizontal axis of the curve, and (b), offset by one base pitch. This type of symmetry, which was discussed in connection with FIG. 7 of Reference 1, is more general than right-left symmetry about the vertical centerline in that it allows for asymmetrical ZTE or self-complementary curves of all kinds. Such ZTE or self-complementary curves occur whenever the conventional tooth pair stiffness curve is slightly asymmetrical, as it tends to be when the gear ratio is substantially greater than unity.

A mathematical description of an overlapped self-complementary curve would be as follows: it is any curve that is the algebraic sum of one or more periodic curves each of which has a period of one base pitch times the synchronous ratio divided by an odd integer, includes the overlapping ordinate contributions of ramp portions at its ends, and is made up entirely of continuous, piecemeal continuous or discontinuous segments all of which have offset inverse symmetry of one base pitch offset. Further, a basic characteristic of this overlapped self-complementary curve is that in order to minimize the required corrections, the area under the curve from one end of the synchronization length to the other should be within ten percent, and preferably within five percent, of the area under the conventional tooth pair stiffness curve over that length.

The diagram of FIG. 4 is complex, and it may be helpful to review and to justify its special features. Basically it is related to the corresponding tooth pair stiffness diagram of FIG. 9 of Reference 1. The principal difference is that the spreading of the corrections to all the teeth in simultaneous contact adds a kind of flat M-shaped correction h-i-j-i'-h' at the apex of the undulating curve 71 in FIG. 7 of Reference 1, and this requires identical inverted corrections at the left and right nadirs, p-l-c-d and p'-l'-c'-d', respectively. (The outermost leg of the inverted M's at the nadirs are beyond the diagram left and right boundaries.) The reason why corrections must be made at the nadirs if one has been made at the apex is that if corrections to a self-complementary curve are not to destroy the self-complementary characteristic, they must embody the same two geometric features that distinguish all self-complementary curves. As noted above, these are (a) synchronized mesh loading and unloading, and (b) inverse offset symmetry.

Confirmation that curve 42 in FIG. 4 does in fact maintain a constant mesh stiffness may be obtained in two ways. One way is to consider that curves that are identical to 42 but are offset by one normal base pitch to the right or the left, so their centerlines are at o-A and o'-A' instead of v-B, may be supposed to be translating, along with curve 42, laterally past a fixed vertical line. (The abscissa variable will in this case be a time variable instead of the displacement variable z shown.) If this translating construction is carried out, it will be found that at any lateral position the sum of the several ordinates that are colinear will be constant.

The second method of confirming that curve 42 produces a constant mesh stiffness is to consider that the curve is stationary and the stiffness ordinates of the tooth pairs that occupy the field of contact simultaneously are translating laterally. In this kind of analysis one has only to add together these ordinates for any of the eight positions (or other desired number) into which the base pitch has been divided. One thus adds the ordinates at a, i and c'; b, j and b'; c, i' and a'; d and h'; e and g'; f and f'; g and e'; and h and d'. For all these arrays of two and three tooth pairs the sum of the stiffness ordinates will be found to be exactly twice the ordinate of the average ordinate line A—A'.

When analyses such as these are made, the purpose of the dotted lines in FIG. 4 will become evident: They are intended to show the effect on portions of curve 42 at the loading ramps a-c and a'-c' produced by the identical tooth stiffness curves of tooth pairs offset by two pitch angles. The dotted line p-b-n is simply the same line as the right hand loading ramp c'-b'-a'. Both will be seen to have the same two segments that are unequal in length and non-colinear. When the ordinates of line p-b-n are added to those of the left hand loading ramp a-b-c, the sum gives the saw-tooth dotted line p-l-c. The segment l-c will have polar symmetry with solid line i-j about point f, and the same relationship will exist for segments l'-c' and i'-j, giving a saw-tooth line over the synchronization length b—b' made up of these four short segments and two long segments, c-i and c'-i'.

It might be considered that this undulating saw-tooth form is an odd and unexpected shape for what appears to be the optimum tooth pair stiffness curve for all mating gears. But this irregular shape becomes immediately understandable when it is considered that gear excitation is generated by deviations of the tooth pair stiffness curve from an ideal curve primarily at the loading ramps. This was explained above in conjunction with FIGS. 1,2 and 3. And secondly, the irregularity at the center of curve 42, at h-i-j-i'-h', is strictly a result of taking advantage, in order to maximize torque capacity, of the possibility of spreading the corrections of these loading ramp deviations (at b, b', c and c') over all of the tooth pairs that are simultaneously in contact. The reason this produces irregularities at the center of the stiffness curve is that when the synchronization ratio is two, the center of the stiffness curve 42 is automatically one pitch angle inside the ends of the synchronization length. These ends, which are at b and b', must always be in the central region of the loading ramp, because this is where the purely elastic means for reducing the mesh stiffness will in most designs give way to conventional tip relief (segments a-b and a'-b'). In some designs it may be found that extending this relief slightly into the synchronization length reduces the peak stresses at b and b' without seriously increasing the transmission error.

FIG. 4 may be somewhat misleading in one respect, and that is in the sharp cusps and V-shaped valleys that it shows. The stiffness curve 42 is given this shape so as to make its features easier to explain. In an actual gear pair stiffness curve all these sharp changes in slope would be rounded because of the fact that the contact surface of the grinding wheel used to make the gears or the shaving cutters that make them has fairly limited curvature. As a result, the sharp angles shown would become precision points maintained by the grinder control program, but between these precision points the slope variations would be much more gradual. The effect of this will be to make the ramps have more of an S-shaped such as shown in FIG. 2, with a mirror image of an S-shape at the opposite end of the synchronization length. Similarly, the cusps and valleys on the stiffness curve 42 will in an actual gear pair take on the form of well-rounded undulations.

Figures 5, 6, 7, 8:
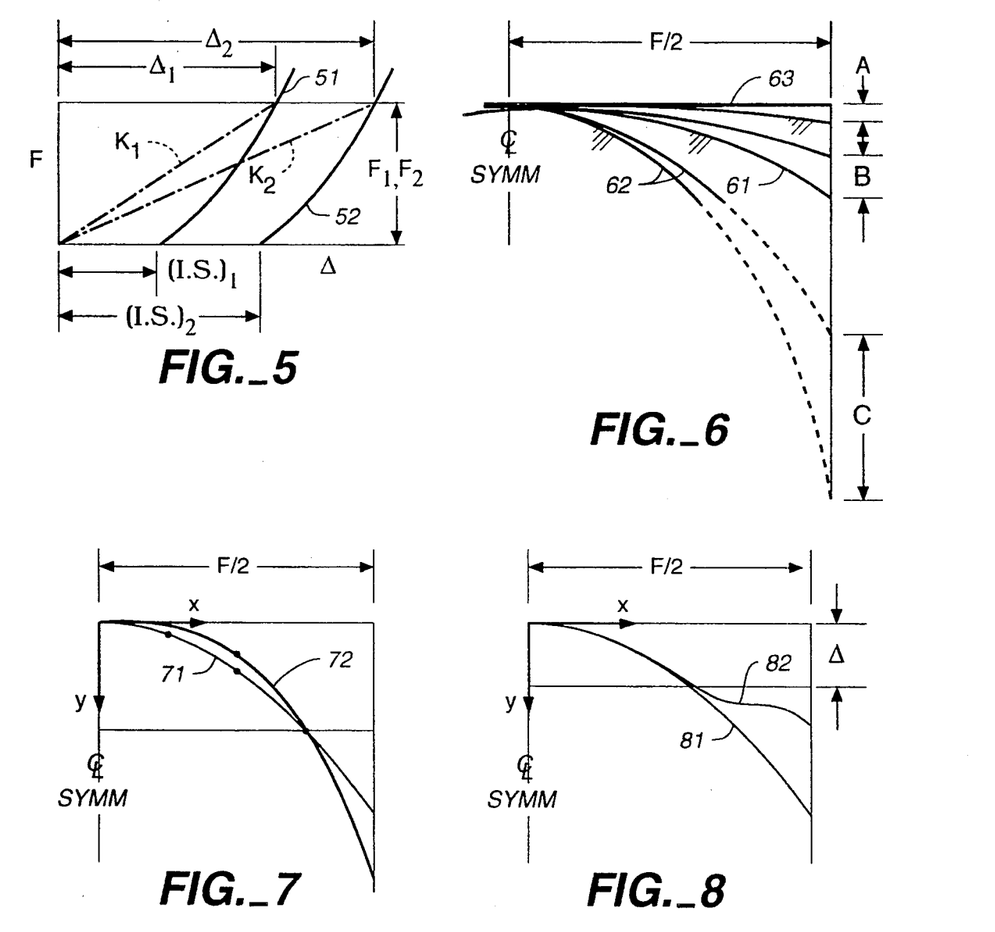
FIG. 5 is a diagram showing how initial separation influences effective stiffness.
FIG. 6 is a diagram showing how the range of the net crowning for one of a gear pair embodying the invention differs at different roll angles. (In effect it illustrates what is intended by the phrase "differential crowning.")
FIG. 7 shows how a crowning curve such as those shown in FIG. 6 are affected by a change in the exponent that governs the distribution of initial separation in the axial direction.
FIG. 8 shows how a crowning curve may be given a "detour" to insure that the STE Curve has the desired shape at both high and low loads.

Moving on to FIG. 5, this diagram is introduced in order to provide a graphical explanation of why initial separation (I.S.) reduces tooth pair stiffness if it is increased, and conversely, increases the stiffness if it is decreased. (Tooth pair and mesh stiffness of gearing, as well as deflection, are always in the transverse direction, even when the gears are helical or spiral bevel.) This figure shows what happens to a purely elastic load-deflection curve 51, which has an initial separation $(I.S.)_1$, and an effective stiffness (or slope) $K_1$, when its initial separation is doubled so as to shift it to position 52. The original stiffness $K_1$, which is the ratio of load to deflection, $F_1/\Delta_1$, is reduced to $K_2$, which is $F_2/\Delta_2$. In effect, the stiffness (slope) $K_2$ has been reduced by the ratio of $\Delta_1/\Delta_2$, or $\Delta_1/(\Delta_1+$the increase in initial separation). It is this effect that explains why crowning, which contributes the major portion of initial separation, can be utilized to introduce useful adjustments to tooth pair stiffness.

FIG. 6 shows how the composite net crowning for a gear pair embodying the invention may vary at different roll angles. It is thus a graphical representation of what is meant by the term "differential crowning". The horizontal and vertical scales in this diagram are made very different so as to accentuate the crowning differences. While the horizontal magnification is perhaps two or three, the vertical magnification may be two or three thousand. In the curves labeled 61 (zone B), the composite lead crowning is plotted. This is essentially conventional crowning in the sense that it is constant for the full working height of the tooth. Ideally it is just sufficient to insure that anticipated misalignment and composite lead error does not produce a peak specific tooth load at either end of the tooth. The curve band of zone B is intended to be construed as indicating that this type of crowning does not exceed five, and preferably not exceed two, times the module times one ten thousandth of an inch (two point five thousandths of a millimeter).

In zone C of FIG. 6 (curve 62), the much greater crowning at b,j or b' is indicated. As FIG. 4 shows, at these roll angles, the conventional tooth pair stiffness curve 41 lies above the self-complementary curve 42, by the increments m-b, t-j, and m'-b', respectively. This means that at the roll angles of these increments curve 41 needs to have its local stiffness reduced, and this calls for increased crowning. This increased crowning is obtained by adding positive supplementary crowning at roll angles b and b' or j, or, preferably, both. Typically this positive supplementary crowning may at b or b' be as great as ten times the composite lead crowning, unless positive supplementary crowning at j is also provided, in which case the amounts will seldom be more than three times the composite lead crowning.

In zone A of FIG. 6 (curve 63), the reduced crowning at the stiffening-needed points c, c', i, and i', is indicated. As noted above, this increased stiffness is needed to eliminate the 2×TCF excitation. Limits to how much reduction in crowning is possible at these four points has been discussed above, but the advantages of reducing the crowning as much as these limits will allow should be noted. One advantage is that it reduces the moment arm for tooth bending. For conventional HCR ("High Contact Ratio") gearing, the critical moment arm is at what is called the "HPDTC", which is an acronym for "Highest Point of Double Tooth Contact." The corresponding point in ZDI gearing is c or c', but at these points the reduced crowning distributes the load more widely over the tooth length and reduces the maximum specific tooth load by about 25% as compared to that of a conventional HCR gear pair. Consequently the largest bending moment is shifted downward from points c and c', usually to points f and f'. The resulting reduction in moment arm gives the ZDI set an advantage in torque capacity that is in the vicinity of 20%.

The second advantage that minimizing the crowning at c and c' bestows on the ZDI gear pair comes indirectly, by allowing the composite lead crowning to be minimized. The use of some typical numbers is illuminating. In FIG. 4 it will be noted that the ordinate n-r is about half as great as the ordinate u'-s'. This means that for the conventional tooth pair stiffness curve 41, the amount of load carried by the tooth pair at r is about half that carried by the tooth pair at s', one base pitch (or one pitch angle) inside of r. Analysis shows that halving the crowning increases the stiffness of a tooth pair about 15%. It has been shown above that the maximum correction that can be made at c or i' is that produced by halving the composite lead crowning. So, the maximum stiffness correction that the minimization of crowning can afford at c is about 15% of the ordinate n-r. If one makes this correction at c, the 33% of the load carried by the tooth pair at c would be increased to at most 40%. The combined increase of stiffness, however, since the 60% of the load carried by the tooth pair at s' is unaffected, would be 15% of 40%, or about 6%. More often than not, this is not a sufficient correction at c. FIG. 9 of Reference 1 shows the needed correction at c to be about 20%. It might be thought that a correction of this magnitude could be obtained if the composite lead crowning were to be increased. This is not the case. An increase in composite lead crowning reduces stiffness at r and s' in the same proportion, so one is still left with the available correction being 6% when 20% is needed.

If corrections are divided among all of the teeth that are simultaneously in contact, this problem is solved. As FIG. 4 shows, the stiffness increments r-c and s'-i' are reduced to about 10%, and substantially the entire 15% increase in stiffness from halving the composite lead crowning at both r and s' is now available. This means that one now has the essential feature needed to eliminate the 2×TCF excitation. The composite lead crowning can remain at the minimum amount needed to prevent excessive tooth end loads, and the achievement of zero dynamic increment will have afforded an effective increase in torque capacity of another 20 to 50%. In general, the goal should be to restrict the composite lead crowning to five, and preferably two, times the module times one ten thousandth of an inch (two point five thousandths of a millimeter).

It will be noted in FIG. 6 that the outermost ends of the zone C curves 62 are shown in broken line. This is done to indicate that in some designs the tooth surfaces that would otherwise contain these large crowning magnitudes may have been removed. The reasons for this will be discussed in connection with FIGS. 9 and 10.

FIG. 7 is another diagram showing, as in the case of FIG. 6, exaggerated crowning curves over a symmetrical half width (F/2) of the tooth length. In this case the crowns 71, 72 diagrammed are plotted to show how changes in the exponent of a crowning curve can redistribute the specific tooth load over the length of the tooth. Curve 71 is a parabolic curve, so the exponent is 2.0, whereas curve 72 is a cubic curve, for which the exponent is 3.0. The advantage of the cubic curve is that for a given tooth pair stiffness, the cubic curve will spread the load more effectively than the parabolic curve. That is to say, the peak specific tooth load at the center of the tooth will be smaller than if the crowning curve is parabolic.

There is a second reason for varying the exponent of the crowning curve, which will be discussed in conjunction with FIG. 8. In all prior art gear forms the tooth modifications have been designed to afford a minimum transmission error at one particular "design load", and loads higher or lower have invariably exhibited increased transmission error. In the present invention, however, a way has been found to manipulate the shape of the crowning curves so that the transmission error remains negligibly small for all loads from zero to peak torque. The principles discussed above can be utilized to determine the amounts of crowning at all active roll angles that for a particular operating torque (e.g. the "design load") will limit the deviation from the average mesh deflection for one full pitch angle to less than ten microinches (0.254 micrometers), and with a modest amount of additional interpolation to less than five microinches (0.127 micrometers) times the module.

In order to eliminate mesh stiffness variation at all loads instead of a single "design load", it is necessary to take into consideration the fact that when curved surfaces are pressed together, the contact area enlarges as the load increases. This characteristic, which enters into the calculation of Hertzian deflection of ball bearing balls or rollers, also applies to gear teeth, since relative curvature is present in both the transverse direction (profile curvature) and the axial direction (crowning curvature).

The non-Hookian characteristic produced by this bidirectional curvature prevents diagrams such as FIG. 2 or FIG. 4 from being valid for more than a single torque load. If these diagrams are taken as representing the tooth pair stiffness at peak torque, analogous diagrams with reduced ordinates are needed to represent the stiffness at half or quarter load. However, each of these additional diagrams will be closely similar to the diagrams shown, and each will have a ZTE or self-complementary tooth pair stiffness curve such as 22 or 42 but with the transverse length of the ramps being slightly reduced (e.g. i-a and i'-a' in FIG. 2, and o-a and o-n in FIG. 4). Fortunately these part-load ZTE or self-complementary curves are not unique in the way the optimum peak load curve is, since there is no longer a need to maximize torque capacity. Any stiffness curve that fulfills the ZTE or self-complementary requirements will be as satisfactory as any other. But in order to determine what modifications will produce a self-complementary stiffness curve at part load, it is necessary to follow a set procedure. No other procedure is possible.

The main requirement for determining a satisfactory set of modifications is to start at the smallest torque load at which it is desired to have the gear set operate silently. The reason for this may be seen in FIG. 8. If the load is small enough so that the mesh deflection $\Delta$ is smaller than the net composite crowning (represented in this figure by the maximum y value of curve 81, at x=F/2), there will be no contact on the outer ends of the teeth. Consequently for large values of x, the shape of the outer portion of the crowning curve is immaterial. The worst that can happen is that once the crowning values for a self-complementary curve for a part-load condition are selected, it may be found that the amount of crowning needed at the given roll angle at high load, including peak load, may not follow a smooth exponential curve such as 81, but may require a sort of "detour" such as shown in curve 82. The same topological grinding equipment that produces curve 81 (or sharpens a plunge shaver to produce that curve) can produce curve 82 just as readily, so there is no need to experiment with other exponents to see if an exponent other than that of curve 81 would have allowed the crowning curve to be less sinuous (as for example curve 72 in FIG. 7).

For all designs there will be a load that is small enough so that the conditions illustrated in FIG. 8 are present. However for gears that are designed for very heavy loads it will often be found that the mesh deflection at say one third of peak load may be greater than the maximum composite crowning. This means that the contact lines in the entire central part of the field of contact, from c to c', occupy the full width of the field. In such cases it cannot be said that the amount of crowning immediately adjacent to the tooth ends has no effect on the tooth pair stiffness at relatively low loads. Nevertheless, crowning curves that will give a self-complementary curve at all loads, from zero to peak load, can, with persistence or sufficient program iteration, always be synthesized. More often than not, such curves will have at various roll angles one or more detours such as shown in curve 82 in FIG. 8. Such curves appear to embody the first pattern of gear tooth modifications that eliminates transmission error with equal effectiveness at all torque loads without requiring superfine teeth and large helix angles.

In gear pairs for vehicular propulsion or other applications where it may be desired that the gear set be substantially silent at all loads, including zero load, the primary feature that is needed is a "high line". This is a continuous line of zero initial separation of length at least one full base pitch, located usually in the central portion of the field of contact. The presence of such a line insures that at zero and very small loads, the teeth will have a true (unmodified) involute curve mating with another true (unmodified) involute curve throughout one complete pitch angle, so there will be no significant transmission error or self-excitation. In the case of gear sets with synchronization ratio greater than unity, it is usually advantageous to make this "high line" of zero initial separation continue for the full synchronization length.

Figure 9:
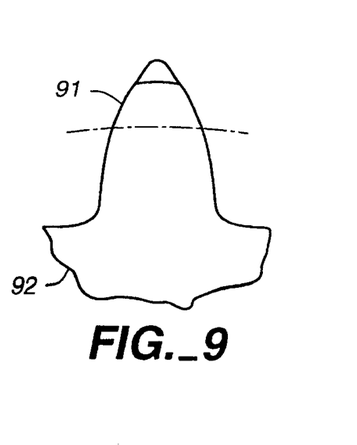
FIG. 9 shows an end view of a typical spur or straight bevel gear tooth embodying the invention and the gear body to which it is attached.
Figure 10:
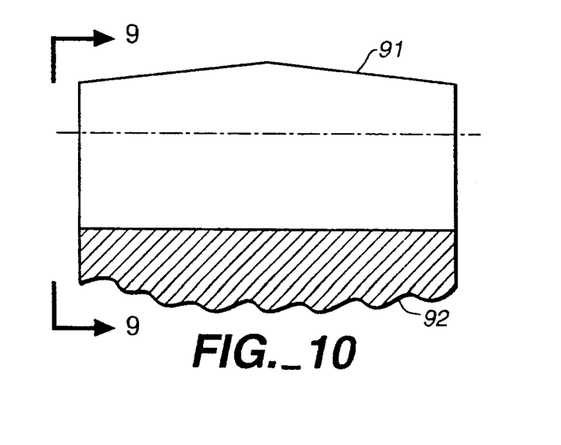
FIG. 10 is a transverse view of a spur tooth such as shown in FIG. 9, indicating the flat beveling that may be applied to the toplands to remove material that has too much initial separation to make contact even at full load.

FIGS. 9 and 10 illustrate a minor improvement that may be made to spur or straight bevel gears 92 embodying the invention, to increase the life of the plunge shaver or grinding wheel that is used to finish the gears. In such gear types the large amount of crowning at b and b' in FIG. 4, combined with the tip relief that extends from b to a and b' to a' and has a magnitude over the full length of the tooth more or less equal to the mesh deflection at peak load, produces a total initial separation at the four corners of the field that substantially exceeds the maximum mesh deflection. As a result, these corners never make contact with the mating gear and might as well be removed so they will not needlessly shorten the wear life of the finishing tool. The flat bevel that cuts back the topland from the center of the tooth 91 outward should not extend further into the tooth body than a point on the gear end faces that is about half way between the roll angles at b and c, or b' and c' as the case may be. The effect of bevels of this kind on the shape of the field of contact of both spur and straight bevel gears may be seen in FIGS. 10 and 12, respectively, of U.S. Pat. No. 3,982,444.

Figure 11:
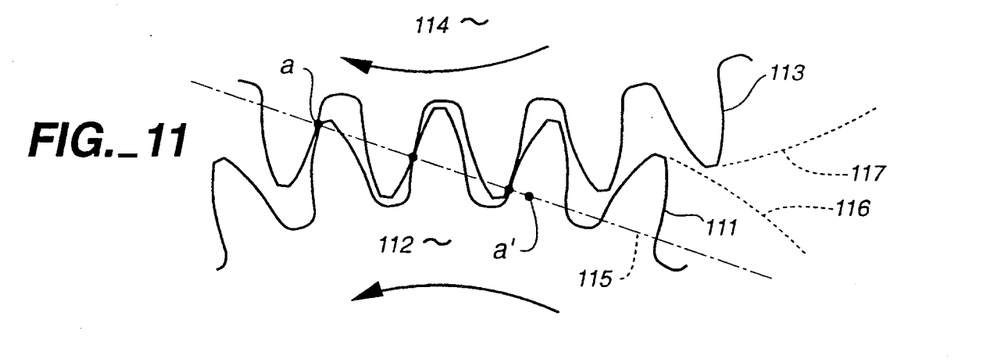
FIG. 11 is a partial section of a pair of mating gears embodying the invention, showing mating teeth in transverse (direction of motion) section.

FIG. 11 is a partial transverse section through a pair of gears 112, 114 showing typical teeth 111, 113 embodying the invention, with arrows showing the direction of motion (transverse direction). Teeth 111 on the smaller of the mating pair (pinion 112) and teeth 113 on file larger of the mating pair (gear 114) make contact along a pressure line 115 that contains the path of contact extending from a starting point at a' and an ending point at a. The active heights at teeth 111, 113 terminate at the addendum circles 116, 117 of the pinion 112 and gear 114, respectively, and determine the position of points a and a', respectively, along the pressure line 115. Other features of pinion 112 and gear 114, such as hubs, webs, rims, keyways, etc. are standard and are omitted in the interest of clarity.

The pressure line 115 in FIG. 11 shows the direction of the path of contact a'-a that appears, to a larger scale, as the base line in FIGS. 2 and 4. It should be noted that both of these figures plot tooth pair stiffness k as a function of distance z along the path of contact. As in Reference 1, the three coordinates used in this specification are x, y, and z. Of these, the x-coordinate defines the position of points in the axial direction, as indicated in FIGS. 7 and 8. Normal to this direction and defining positions in the direction of movement of the contact points along paths of contact such as line a'-a in FIG. 1, is the z-coordinate. In most systems of orthogonal coordinates the third variable, y, is normal to the x and z directions. In this specification, however, a different system of using the y dimension is employed: It represents modifications to the theoretical ideal involute profile or lead curves and is in the same direction as the z-coordinate, that is to say, in the direction of line 115 in FIG. 1. As noted above, the scale used in representing these modifications in the y direction is very much greater than that used for x and z.

Several observations about the nature and scope of the invention may be made:

(1) Interchangeability: It is also possible to create a set of any desired number of gears all having different tooth numbers, such that any of the gears will mate with any other gear of the set and will in addition have the "zero dynamic increment" (ZDI) characteristic described in this specification. Several basic properties would have to be identical on all gears, including base pitch, pressure angle, approximate tooth thickness at the pitch point, and topological modifications that produce a self-complementary stiffness curve. If helical gears are used, the base helix angles must also be identical, and the number of gears in the set must be doubled to include both right and left hand helices for each tooth number. All of these gears, whether spur or helical, would also have to have the same length of contact, evenly divided between approach and recess action. To meet these requirements gears with larger tooth numbers must have progressively shorter addenda and increased dedenda. As with all sets of interchangeable gears, major reductions in cost are attainable because of reduced design time and increased production quantities.

(2) Helical gearing: In conventional gearing, a helix angle (or spiral angle, in the case of bevel gears) is often needed to reduce the static and dynamic transmission error. This is not the case with ZDI gearing, however, which uses differential crowning instead. Nevertheless some designers may specify a helix or spiral angle for special purposes. When this is done, several features are recommended: (a) The best profile contact ratio is close to 2.0. (b) The preferred type of high line is non-straight and is the locus of the centers of the contact lines as they move through the field of contact. (c) The roll angles used to identify contact line positions in FIG. 4 and similar diagrams are, for helical gear sets, the roll angles of the contact lines (or their extensions if they are truncated by the end boundaries of the field) at the central transverse plane of the set, so points a and a' in FIGS. 2 and 4 will usually be beyond the field boundaries. (d) As indicated in FIG. 4, the self-complementary curve 42 requires substantial stiffening at the inner ends of the ramps c and c', and this objective is best served in helical gearing through maximizing the length of the contact line at those two points by making the transverse lengths of the ramps (a-n, a'-n') substantially equal to the face width times the tangent of the base helix angle, or spiral angle in the case of bevel gearing. It should be noted that in helical and spiral bevel gearing, the contact lines intersect the common pitch element (i.e., the line of tangency of the pitch cones) at the base helix angle or spiral angle, as the case may be.

(3) Critical tooth numbers: As in the case of conventional gearing, torque capacity as a function of pinion tooth numbers is a falling curve for tooth bending fatigue and a rising curve for pitting (Hertzian) failure. The tooth number at which these two curves intersect is called the "critical number of teeth," and it is at this tooth number that any gear set has the maximum torque capacity. This is also true of ZDI gearing, so whenever possible pinion tooth numbers should be within four, and preferably two, of this critical tooth number.

(4) Face width: The common practice of making the pinion slightly wider than the gear is avoided, as it always should be when crowning is present. In no case should the face width of the wider member be greater than that of the narrower member by more than one percent or so. The reason lies in the serious effects of buttressing on stress distribution.

(5) Symmetry: By proportioning the operating tooth thickness ratio, pressure angle and addendum heights and root clearances so as to make the conventional tooth pair stiffness curve substantially symmetrical, ZDI gears will be given a substantially symmetrical self-complementary curve such as shown in FIG. 4. As in all gearing, minimum peak stresses are achieved when the tooth pair stiffness curve is symmetrical. In addition, symmetry of this curve allows both members to be finished by the same tool, the advantages of which are noted in (7) below. Having the same modifications of both members at their mating points will be desirable in nearly all designs.

(6) Manufacturing methods: The kind of tooth working surface modifications called for in this specification are a special pattern of what are called "topological modifications." (In some literature the preferred usage is "topographical modifications.") The most economical way of forming these modifications, or making the plunge shavers with which to form them, is with the aid of generative gear grinding machines that have the necessary topological feature. One of the main advantages of the invention is that it discloses a pattern of net crowning curves that because they can be identical can be formed on the plurality of teeth that are ground simultaneously by the continuous-worm type of grinding wheel when the synchronization ratio is greater than unity.

(7) Manufacturing accuracy: The concepts disclosed in the present specification are believed to move the theory of gearing sufficiently far in the direction of ideal design so that the practical limitation on operation without noise or dynamic increment will in the future lie almost entirely with accuracy of manufacture. The minimization of all forms of fabrication error therefore becomes a paramount consideration. In order to realize the potential benefits of ZDI gearing a number of special fabrication techniques are recommended: The most important error in ZDI gearing to eliminate is base pitch error. In effect this type of error mates gears that have slightly different tooth spacing. What this does is to give a diagram such as that of FIG. 4 a pronounced overall slope or rotation, so that one end is higher than the other. When this condition is present all of the corrections that have been described above may become secondary. The slope comes from the fact that unequal base pitch values introduce an initial separation, such as that shown in FIG. 5, at either the beginning or the end of the contact path, greatly reducing the effective tooth pair stiffness at the point where it occurs. The self-complementary curve no longer gives a constant ordinate sum, but one that has a pronounced upward slope followed by a sudden drop in the vicinity of one of the ramps. To avoid this effect, and to maintain an average base pitch for one of a gear pair that differs from that of the other by not more than twenty, and preferably not more than ten, microinches (i.e., by not more than 0.508, and preferably by not more than 0.254, micrometers) times twice the module, a number of expedients are useful. The most convenient method of getting an exactly equal base pitch on the pinion and gear is to finish them with the same tool. The specification of spur teeth instead of helical allows the use of a common plunge shaver or hone. For ground gearing, the use of the same worm-type grinding wheel or rocking-type base tangent grinder set-up on both pinion and gear will help greatly. The next best alternative is to employ base tangent measurements in preference to over pin measurements, combined with size sorting of finishing tools or finished gears or both. Out-of-tolerance members may be honed or lapped.

It should be appreciated that the foregoing specification has disclosed a gear form that has substantial advantages over prior art gear forms but needed to be defined in more precise mathematical terms. Gearing having slightly different proportions and characteristics but embodying essentially the same concepts can readily be designed and will exhibit almost equal advantages. The foregoing specification and the ensuing claims are intended to read on such gearing as well as gearing that adheres to the precise characteristics enumerated.

I claim:

1. A pair of gears having mating teeth with differential crowning, the tooth pair stiffness curve of said gears being a self-complementary curve.

2. A pair of gears having mating teeth with differential crowning, the tooth pair stiffness curve of said gears being a self-complementary curve with a synchronization ratio of at least two, said differential crowning including supplementary crowning at at least one roll angle one pitch angle smaller than the roll angle of a point on one of the loading ramps of said stiffness curve.

3. A pair of gears having mating teeth with differential crowning, said gears having a tooth pair stiffness curve that is a zero transmission error curve and having at least two, and preferably all, of three features adapted to maximize torque capacity, comprising (a) the particular zero transmission error tooth pair stiffness curve that minimizes the lead crowning; (b) the particular values of said differential crowning that afford optimum spreading of tooth loads; and (c) the number of teeth on the pinion within four, and preferably two, of the critical number.

4. A pair of gears according to claim 1,2 or 3 wherein said differential crowning includes supplementary crowning at at least two roll angles one pitch angle smaller than the roll angle of a point on one of the loading ramps of said stiffness curve.

5. A pair of gears according to claim 1,2 or 3 wherein said differential crowning includes positive supplementary crowning at two roll angles that differ by one pitch angle.

6. A pair of gears according to claim 1,2 or 3 wherein said differential crowning includes negative supplementary crowning at two roll angles that differ by one pitch angle.

7. A pair of gears according to claims 1, 2, or 3 wherein said differential crowning includes positive supplementary crowning at two roll angles that differ by one pitch angle, and includes also negative supplementary crowning at two other roll angles that also differ by one pitch angle.

8. A pair of gears according to claim 1,2 or 3 wherein said self-complementary curve has at the ends of the synchronization length loading ramps that have two unequal segments that are not colinear.

9. A pair of gears according to claim 1,2 or 3 wherein the ordinates of the conventional tooth pair stiffness curve at the ends of the synchronization length are substantially equal.

10. A pair of gears according to claim 1,2 or 3 wherein the area under said self-complementary curve over the synchronization length is within ten, and preferably five, percent of the area under the conventional tooth pair stiffness curve over said length.

11. A pair of gears according to claim 1,2 or 3 wherein supplementary crowning is provided at all roll angles at which the ordinates of a conventional tooth pair stiffness curve have significant differences from a self-complementary curve, the magnitude of said supplementary crowning being selected to eliminate said differences.

12. A pair of gears according to claim 1,2 or 3 wherein the synchronization ratio is an even integer and the shape of said self-complementary curve including ramp overlap corrections is an undulating saw-tooth form having two long and four short saw-tooth sides in said synchronization length.

13. A pair of gears according to claim 1,2 or 3 wherein means are provided to reduce the mesh stiffness at the tooth engagement position in which lines of contact contain the end points of the synchronization length.

14. A pair of gears according to claim 13 wherein said means includes positive supplementary crowning at the roll angles of at least one contact line of said tooth engagement position.

15. A pair of gears according to claim 13 wherein said means includes forming said teeth at an angle with the common pitch element of said pair whereby the contact lines furthermost from the centroid of the field of contact are truncated by the end boundaries of said field.

16. A pair of gears according to claim 13 wherein said means includes tip relief that extends slightly into said synchronization length.

17. A pair of gears according to claim 1,2 or 3 wherein positive supplementary crowning is provided at roll angles one pitch angle smaller than the roll angles corresponding to the ends of the synchronization length.

18. A pair of gears according to claims 1, 2, or 3 wherein means are provided to reduce the mesh stiffness at the tooth engagement position in which lines of contact contain the end points of the synchronization length, and positive supplementary crowning is provided at roll angles one pitch angle smaller than the roll angles corresponding to the ends of the synchronization length.

19. A pair of gears according to claim 1,2 or 3 wherein negative supplementary crowning is provided at roll angles corresponding to the inner ends of the ramps.

20. A pair of gears according to claim 1,2 or 3 wherein negative supplementary crowning is provided at roll angles one pitch angle smaller than the roll angles corresponding to the inner ends of the ramps.

21. A pair of gears according to claims 1, 2, or 3 wherein negative supplementary crowning is provided at roll angles corresponding to the inner ends of the ramps and also at roll angles one pitch angle smaller than the roll angles of said inner ends.

22. A pair of gears according to claims 18 wherein negative supplementary crowning is provided at roll angles corresponding to the inner ends of the ramps and also at roll angles one pitch angle smaller than the roll angles of said inner ends.

23. A pair of gears according to claim 1,2 or 3 wherein said crowning at all active roll angles has magnitudes that at a particular operating torque produce a mesh deflection that deviates less than ten microinches (0.254 micrometers), and preferably less than five microinches (0.127 micrometers) times the module, from the average mesh deflection for one full pitch angle of said pair.

24. A pair of gears according to claim 1,2 or 3 wherein said crowning includes composite lead crowning not exceeding five, and preferably not exceeding two, times the module times one ten thousandth of an inch (two point five thousandths of a millimeter).

25. A pair of gears according to claim 1,2 or 3 wherein said crowning includes composite negative supplementary crowning at one of the stiffening-needed roll angles within plus or minus twenty percent, and preferably within plus or minus ten percent, of half the composite lead crowning.

26. A pair of gears according to claim 1,2 or 3 wherein the synchronization ratio is at least two and said crowning includes negative supplementary crowning at roll angles one pitch angle inside the roll angles of the inner ends of the ramps sufficient to produce net composite crowning at those roll angles not exceeding plus or minus twenty percent, and preferably ten percent, of the composite lead crowning.

27. A pair of gears according to claim 1,2 or 3 wherein said crowning includes positive supplementary crowning at the roll angles of the outer ends of the synchronization length amounting to three to ten times the composite lead crowning.

28. A pair of gears according to claim 1,2 or 3 wherein said crowning includes positive supplementary crowning at roll angles one pitch angle inside the roll angles of the outer ends of the synchronization length, the composite amount of said supplementary crowning not exceeding three times the composite lead crowning.

29. A pair of gears according to claim 1,2 or 3 wherein the face width of neither gear is greater than the active face width by more than three percent and preferably one percent.

30. A pair of gears according to claim 1,2 or 3 wherein the operating tooth thickness ratio, pressure angle, addendum heights and root clearances are selected to produce substantial symmetry of the conventional tooth pair stiffness curve.

31. A pair of gears according to claim 1,2 or 3 wherein said teeth intersect the common pitch element at an angle and the high line is non-straight and is the locus of the centers of the contact lines as they move through the field of contact.

32. A pair of gears according to claim 1,2 or 3 wherein the ordinate of the self-complementary tooth pair stiffness curve differs from the ordinate of the conventional tooth pair stiffness curve by not more than twenty percent, and preferably not more than ten percent, at any point on the synchronization length.

33. A pair of gears according to claim 1,2 or 3 wherein the lines of contact of said teeth intersect the common pitch element at an angle, the profile contact ratio is substantially an integer, and each loading ramp has substantially the same transverse length as the face width times the tangent of said angle.

34. A pair of gears according to claim 23 wherein said crowning produces said mesh deflection throughout the full range of operating torques of said gears.

35. A pair of gears according to claim 34 wherein said full range extends continuously from zero to peak torque.

36. A pair of gears according to claim 1,2 or 3 wherein a continuous line of zero initial separation and having a length, if projected onto the normal plane, of at least one full normal base pitch, is provided in the central portion of the field of contact.

37. A pair of gears according to claim 36 wherein said length embraces the full extent of the synchronization length.

38. A pair of gears according to claim 36 wherein the lines of contact of said teeth intersect the common pitch element at an angle and said continuous line is non-straight.

39. A pair of gears according to claim 1,2 or 3 wherein one of said pair has a roll angle at which the net crowning curve is substantially an exponential curve for which the exponent is greater than two.

40. A pair of gears according to claim 1,2 or 3 wherein at least one of said pair has at least one roll angle at which the crowning curve is exponential but has at least one detour.

41. A pair of gears according to claim 1,2 or 3 wherein the modifications of the working surfaces at all mating points are the same on the gear as on the pinion.

42. A pair of gears according to claim 1,2 or 3 wherein the toplands are beveled on either side of the center of the tooth length to a depth sufficient to remove substantially all tooth tip portions for which the initial separation is greater than the mesh deflection at peak torque.

43. A pair of gears according to claim 42 wherein the lines of contact between said teeth intersect the common pitch element at an angle.

44. A pair of gears according to claim 1,2 or 3 wherein said gears are members of a large set of fully interchangeable gears having different tooth numbers but a group of features that are substantially identical, including base pitch, pressure angle, self-complementary tooth pair stiffness curve for mating gears of said set having the same number of teeth, tooth thickness at the pitch line, and base helix angle absolute value if not zero for both of said gears.

45. A pair of gears according to claim 44 wherein the active addendum circles of said pair each have an intersection point with the pressure line of said pair at the same distance from the pitch point of said pair but on opposite sides of said pitch point.

46. A pair of gears according to claim 44 wherein one of said pair has more teeth than the other and a deeper dedendum that reduces its tip stiffness to the same value as that of the other of said pair.

47. A pair of gears according to claim 44 wherein the modifications to the working surfaces are substantially identical at all mating points.

48. A pair of gears according to claim 1,2 or 3 wherein the net crowning curves on a working surface of the teeth of one of said pair at a set of roll angles at which a plurality of tooth pairs are in contact simultaneously are substantially identical.

49. A pair of gears according to claim 48 wherein said curves at all such sets of roll angles are substantially identical.

50. A pair of gears according to claim 1,2 or 3 wherein one ramp has a substantial S-shape and the other ramp has the mirror image of said S-shape.

51. A pair of gears according to claims 3 wherein the synchronization ratio is at least two and said differential crowning includes supplementary crowning at at least one roll angle one pitch angle smaller than the roll angle of a point on one of the loading ramps of said stiffness curve.

52. A pair of gears according to claim 1,2 or 3 wherein the average base pitch for one of said pair differs from that of the other by not more than twenty, and preferably by not more than ten, microinches (by not more than 0.508, and preferably by not more than 0.254, micrometers) times twice the module.

* * * * *